(12) United States Patent
Stodden

(10) Patent No.: US 12,077,416 B1
(45) Date of Patent: Sep. 3, 2024

(54) RETRIEVAL DEVICE

(71) Applicant: Michael F. Stodden, Rocky Point, NC (US)

(72) Inventor: Michael F. Stodden, Rocky Point, NC (US)

(*) Notice: Subject to any disclaimer, the term of this patent is extended or adjusted under 35 U.S.C. 154(b) by 0 days.

(21) Appl. No.: 18/624,812

(22) Filed: Apr. 2, 2024

Related U.S. Application Data

(60) Provisional application No. 63/458,213, filed on Apr. 10, 2023.

(51) Int. Cl.
  *B66C 1/44* (2006.01)
  *E21B 31/18* (2006.01)
  *H04N 23/57* (2023.01)

(52) U.S. Cl.
  CPC ............... *B66C 1/44* (2013.01); *E21B 31/18* (2013.01); *H04N 23/57* (2023.01)

(58) Field of Classification Search
  CPC .. B25J 1/02; B66C 1/422; B66C 1/442; E21B 31/18
  USPC ............................ 294/86.28, 86.32, 100, 111
  See application file for complete search history.

(56) References Cited

U.S. PATENT DOCUMENTS

| | | | |
|---|---|---|---|
| 827,011 A | 7/1906 | Griffin | |
| 1,466,916 A * | 9/1923 | Pearl | E21B 31/18 294/115 |
| 1,563,600 A * | 12/1925 | Walton | E21B 31/18 294/86.28 |
| 1,781,335 A | 11/1930 | Lyons | |
| 2,261,564 A | 11/1941 | Robichaux | |
| 2,590,487 A | 3/1952 | Raymond | |
| 3,902,751 A | 9/1975 | Burkepile | |
| 4,047,568 A | 9/1977 | Merle | |
| 4,253,697 A * | 3/1981 | Acosta | B25J 1/02 294/111 |
| 4,580,826 A | 4/1986 | Carver | |
| 4,940,095 A | 7/1990 | Newman | |
| 4,969,514 A | 11/1990 | Morris | |
| 4,995,661 A * | 2/1991 | Aurness | E01H 1/1206 294/1.4 |
| 5,611,587 A * | 3/1997 | Brown | B66C 3/06 294/111 |
| 6,106,042 A * | 8/2000 | McCloy, Jr. | B66C 1/42 294/100 |

(Continued)

*Primary Examiner* — Dean J Kramer
(74) *Attorney, Agent, or Firm* — My Patent Guys; Christopher Pilling

(57) ABSTRACT

The present disclosure relates to an innovative retrieval device designed for the efficient recovery of items from deep wells, plumbing pipes, and similar structures. The device features a body with a plurality of arms attached to its distal end, each arm equipped with specialized gripping features to securely capture and retrieve items. A control cable is connected to the arms, facilitating their movement from an open to a closed position for item capture. The inclusion of a camera device within the body aids in precise item location, while a resilient connecting device allows for adjustment to the retrieval depth through an additional cable at any desired depth. Enhanced functionality is introduced through optional features such as a body tube for length extension, skids for improved navigation within pipes, and different cable configurations for optimized arm closure.

12 Claims, 16 Drawing Sheets

(56) References Cited

U.S. PATENT DOCUMENTS

| | | |
|---|---|---|
| 6,427,776 B1 | 8/2002 | Hoffman |
| 10,362,204 B2 * | 7/2019 | Edwards .................... B25J 1/02 |

* cited by examiner

RETRIEVAL DEVICE

CROSS-REFERENCE TO RELATED APPLICATIONS

The present invention claims priority to provisional application 63/458,213 filed Apr. 10, 2023 which is hereby incorporated in its entirety, at least by reference.

BACKGROUND OF THE INVENTION

1. Field of the Invention

The present invention relates to retrieval devices, but more specifically retrieval devices for deep wells and plumbing pipes.

2. Description of Related Art

Occasionally, items need to be recovered from deep wells, plumbing pipes, or similar tubes. Currently, grappling hooks and magnet type devices are some of the common retrieval tool types being used today. Often the situation, depth, clearance, well diameter, and other factors prevent or necessitate the use of one or more types of retrieval tools. Sometimes, camera systems are used to locate the lost or broken item within the well.

Known retrieval devices include: Aulenbacher, Merle W. "Method and apparatus for cutting and retrieving casing from a well bore." U.S. Pat. No. 4,047,568, issued Sep. 13, 1977; Axelstrom, Raymond E., "Well rod grab." U.S. Pat. No. 2,590,487, issued Mar. 25, 1952; Burkepile, Ivan H., Burkepile, Jimmie J., "Well pipe retrieving device." U.S. Pat. No. 3,902,751, issued Sep. 2, 1975; Carver, Herman C., Michael R. Kent, and Bernie L. Chalmers. "Retrieval tool." U.S. Pat. No. 4,580,826, issued Apr. 8, 1986; Griffin, Claud Champ. "Pipe-grip." U.S. Patent 827,011, issued Jul. 24, 1906; Hoffman, Corey E., Richard Lee Giroux, Mike A. Luke, and Stephen J. Norris. "Sand removal and device retrieval tool." U.S. Pat. No. 6,427,776, issued Aug. 6, 2002; Lyons, John E., "Pipe grab." U.S. Pat. No. 1,781,335, issued Nov. 11, 1930; Morris, George HO, and Robert F. Mitchell. "Apparatus for retrieving pipe sections from a well bore." U.S. Pat. No. 4,969,514, issued Nov. 13, 1990; Newman, Kenneth R. "Deployment/retrieval method and apparatus for well tools used with coiled tubing." U.S. Pat. No. 4,940,095, issued Jul. 10, 1990; and, Robichaux, Sosthene. "Method of removing stuck pipe from wells." U.S. Pat. No. 2,261,564, issued Nov. 4, 1941.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In one aspect of the invention, a retrieval device is provided, comprising a body; a plurality of arms attached to a distal end of the body, wherein each arm includes gripping features designed to secure items to be retrieved; and, a control cable connected to the plurality of arms to facilitate movement from an open to a closed position, thereby enabling capture of an item.

In one embodiment, a resilient connecting device attached to the control cable is provided, configured for connection to an additional cable of suitable length based on retrieval depth. In one embodiment, a camera device positioned within the body is provided to aid in locating the item to be retrieved. In another embodiment, the body is a hollow cylinder allowing for the insertion of the camera device such that its lens extends towards the end of the retrieval device. In yet another embodiment, a set screw for securing the camera device within the body is provided.

In one embodiment, the gripping features are selected from at least one of flared ends, flanged sections, protrusions, textures, and full closure ends, wherein the gripping features are designed to improve grip on the intended item. In one embodiment, the control cable is configured to wrap around the plurality of arms in a crisscross formation to maximize closure efficiency with minimal user effort. In one embodiment, a channel located near the distal end of each arm of the plurality of arms is provided, wherein the channel is configured to guide the control cable to facilitate the pulling and closing of the arms. In another embodiment, a body tube is configured to attach to the body enabling an extension of the body to a desired length, wherein the body tube is rigid or flexible.

In one embodiment, skids are attached to the body to maintain elevation and facilitate ease of movement within horizontal pipes. In one embodiment, the plurality of arms are configured to act as skids for the distal end of the device when in contact with the interior surfaces of a well or pipe. In another embodiment, the plurality of arms are mounted within the interior of the body, and a hole is provided on the body to allow the control cable to extend from the exterior to within the body. In yet another embodiment, the plurality of arms are capable of transitioning between open and closed positions through user manipulation of the control cable, allowing for the capture and release of items.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a retrieval device.

Figure 1:
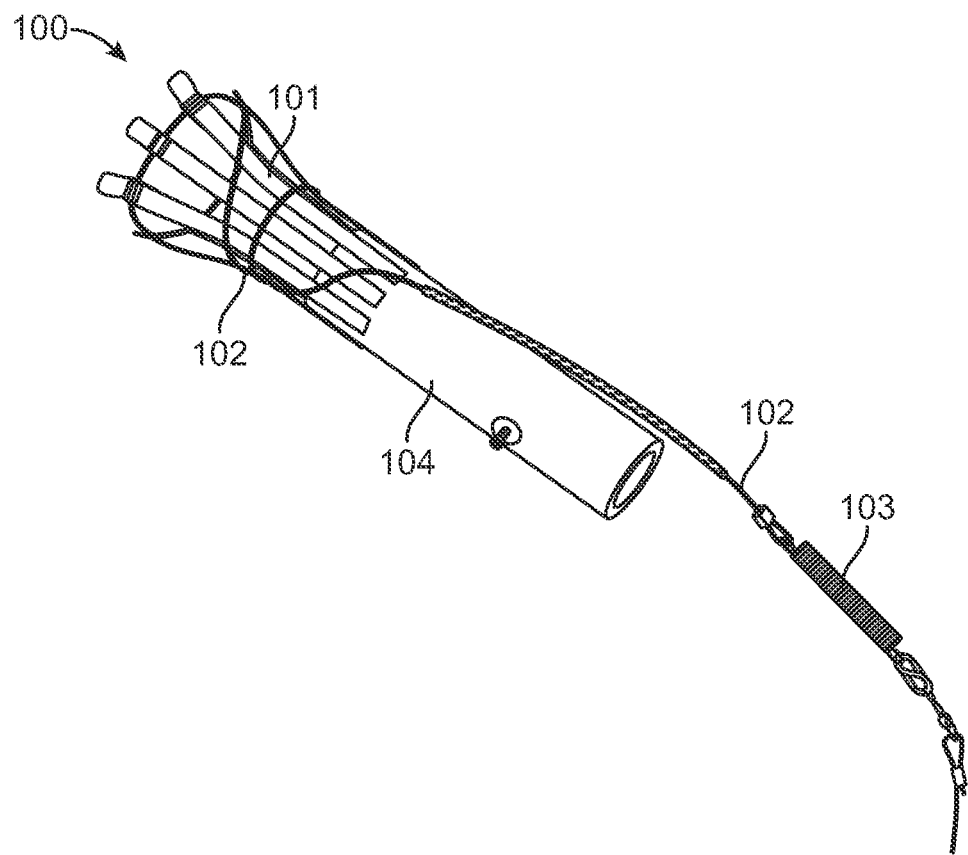
FIG. 1 is a perspective view of a retrieval device according to an embodiment of the present invention.
Figure 2:
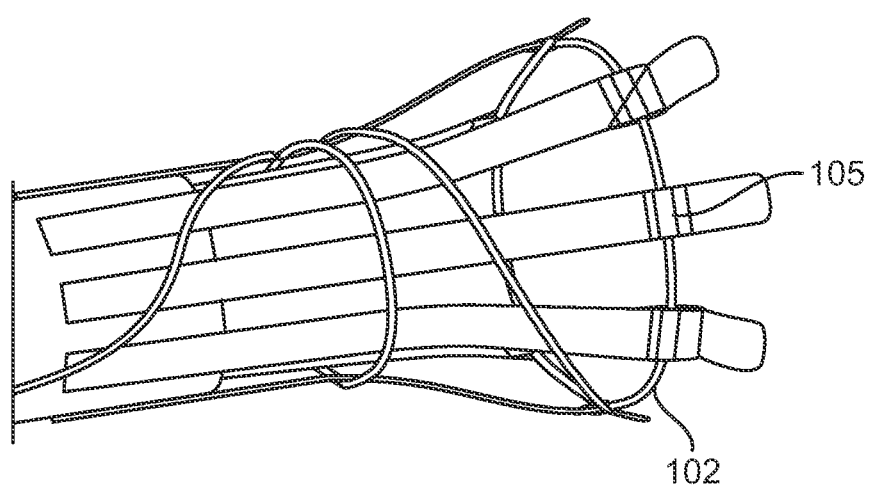
FIG. 2 is a detailed view of FIG. 1.
Figure 3:
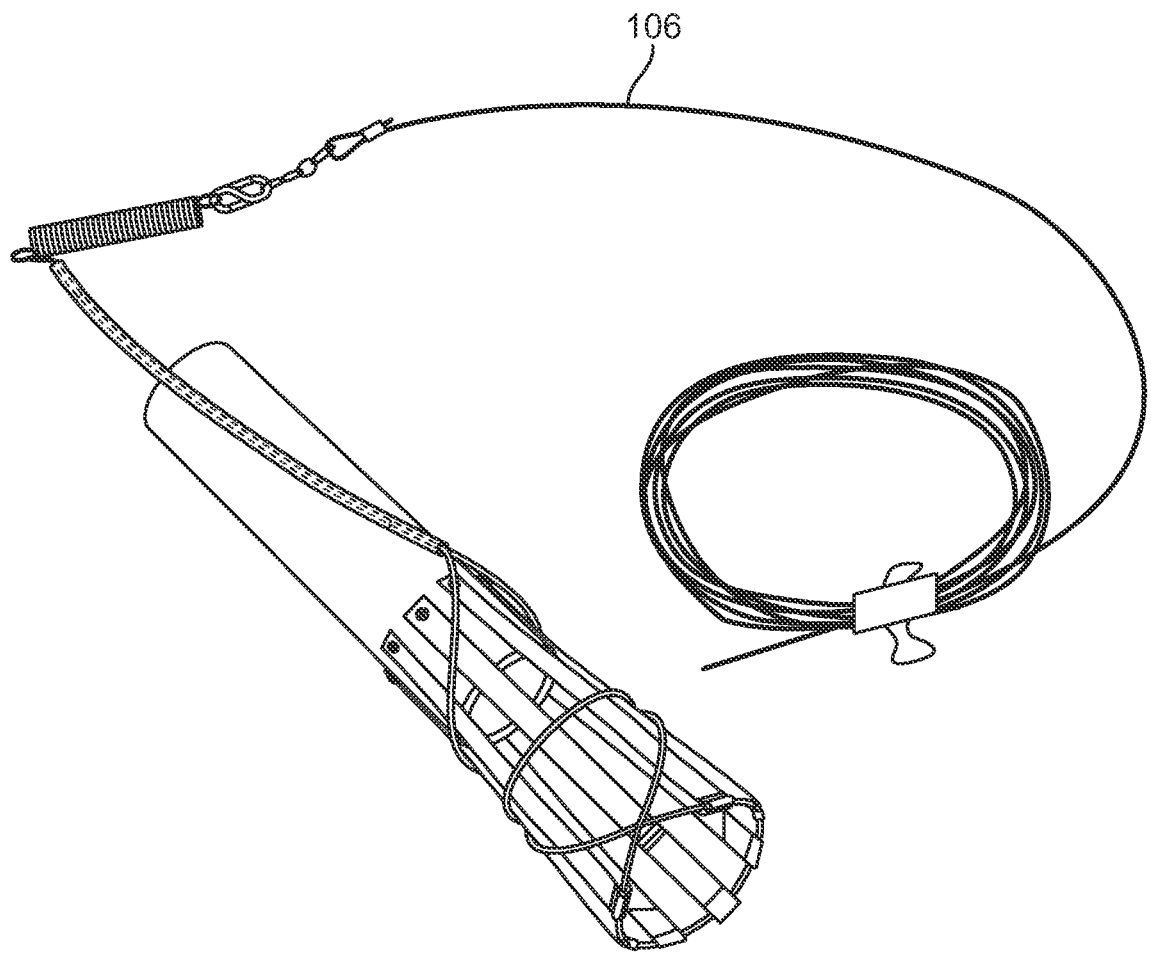
FIG. 3 is a front perspective view of the retrieval device according to an embodiment of the present invention.

FIGS. 1-3 are various views of a retrieval device 100 according to an embodiment of the present invention. Referring to FIGS. 1-3, in some embodiments, retrieval device 100 comprises a plurality of arms 101, a control cable 102, a resilient connecting device 103, and a body 104. During use, the control cable 102 is configured to engage the plurality of arms 101 enabling each arm to move from an open to closed position to enable an item (not illustrated) to be captured, caught, grabbed etc. between the closed "jaws" of the plurality of arms. The details and operation of the control cable will be discussed in greater detail below.

Figure 6A:
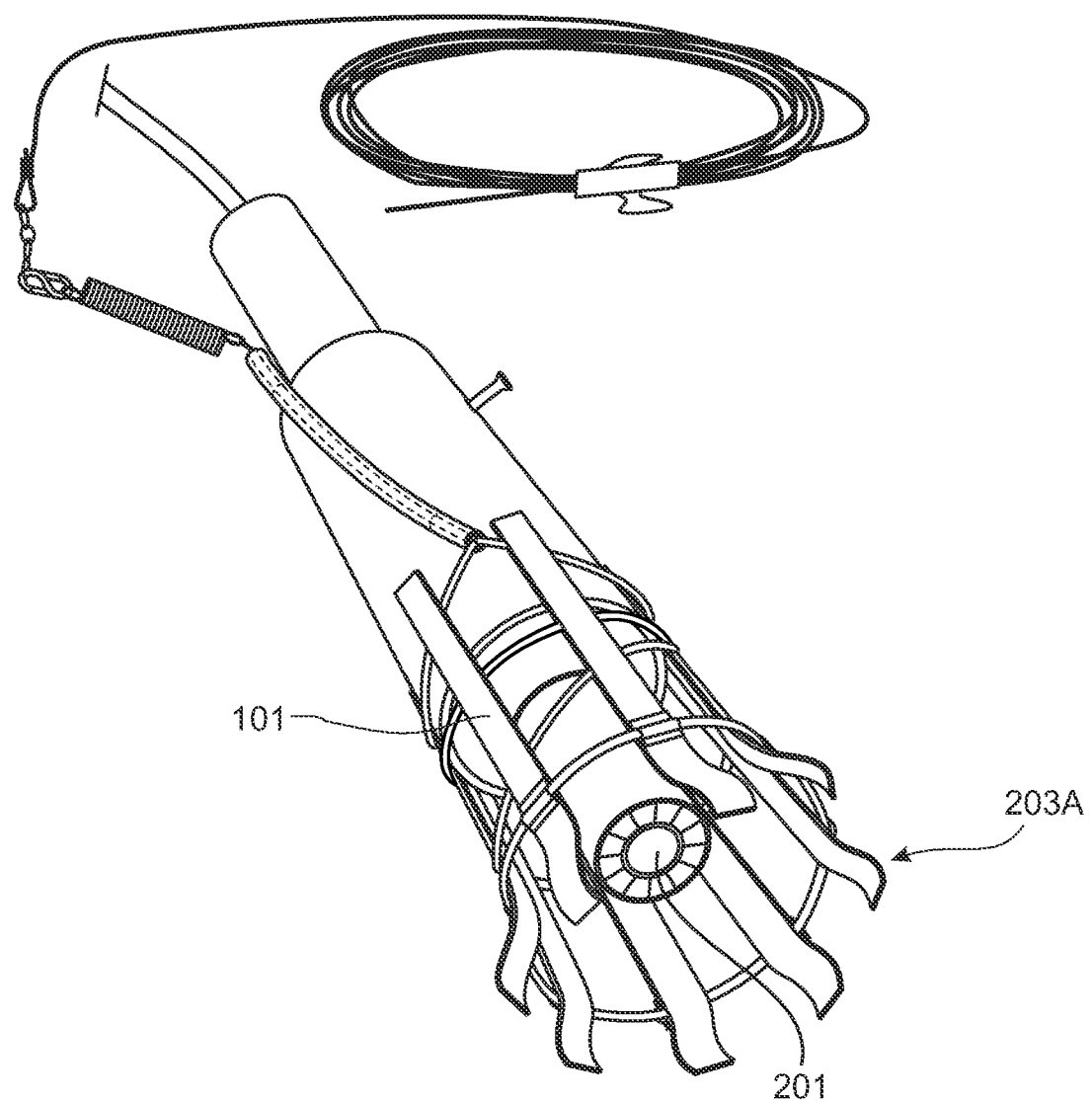
FIG. 6A-C are detailed views of the retrieval device showing the camera lens of the camera device and various gripping features according to an embodiment of the present invention.
Figure 6B:
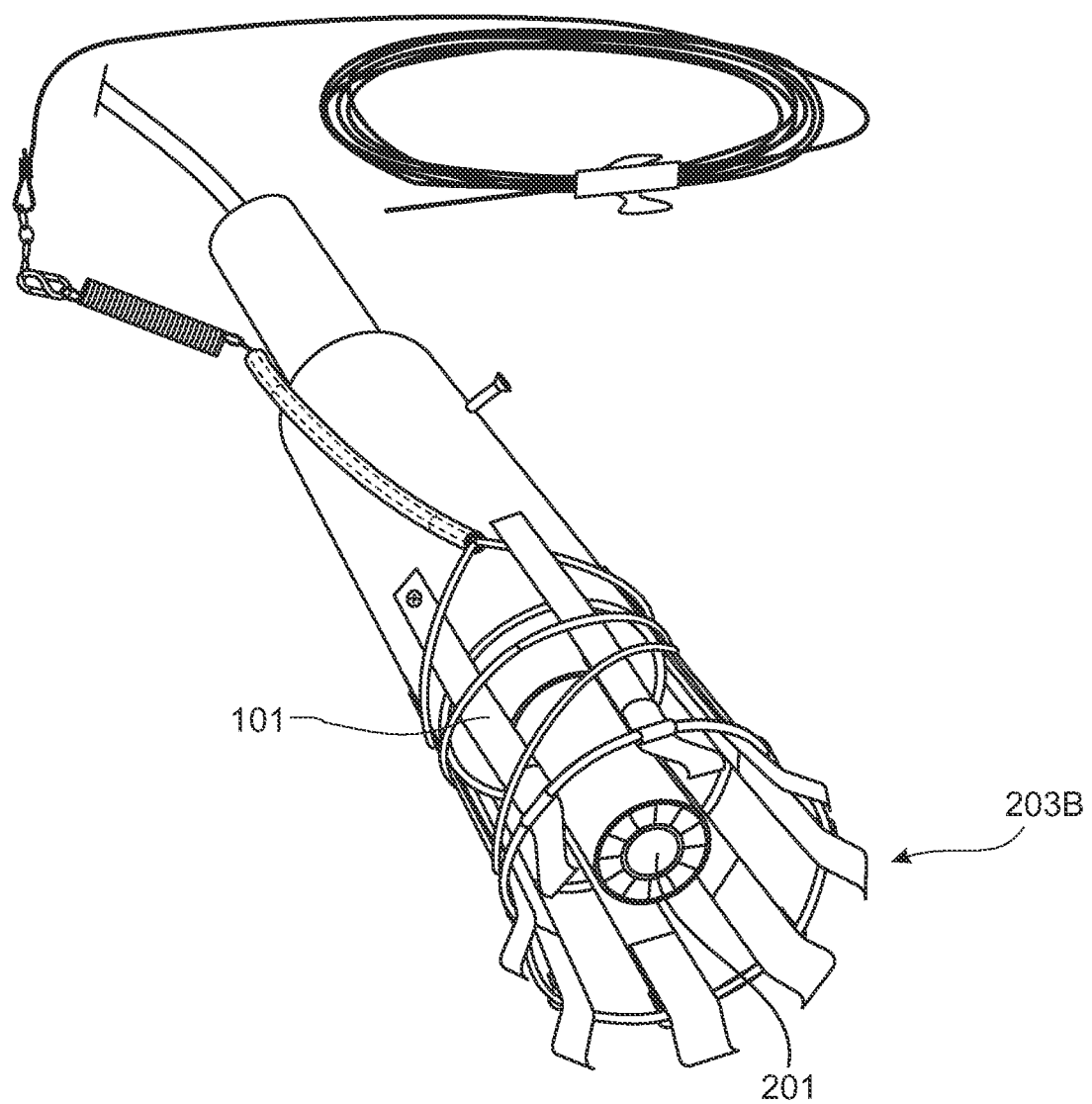
Figure 6C:
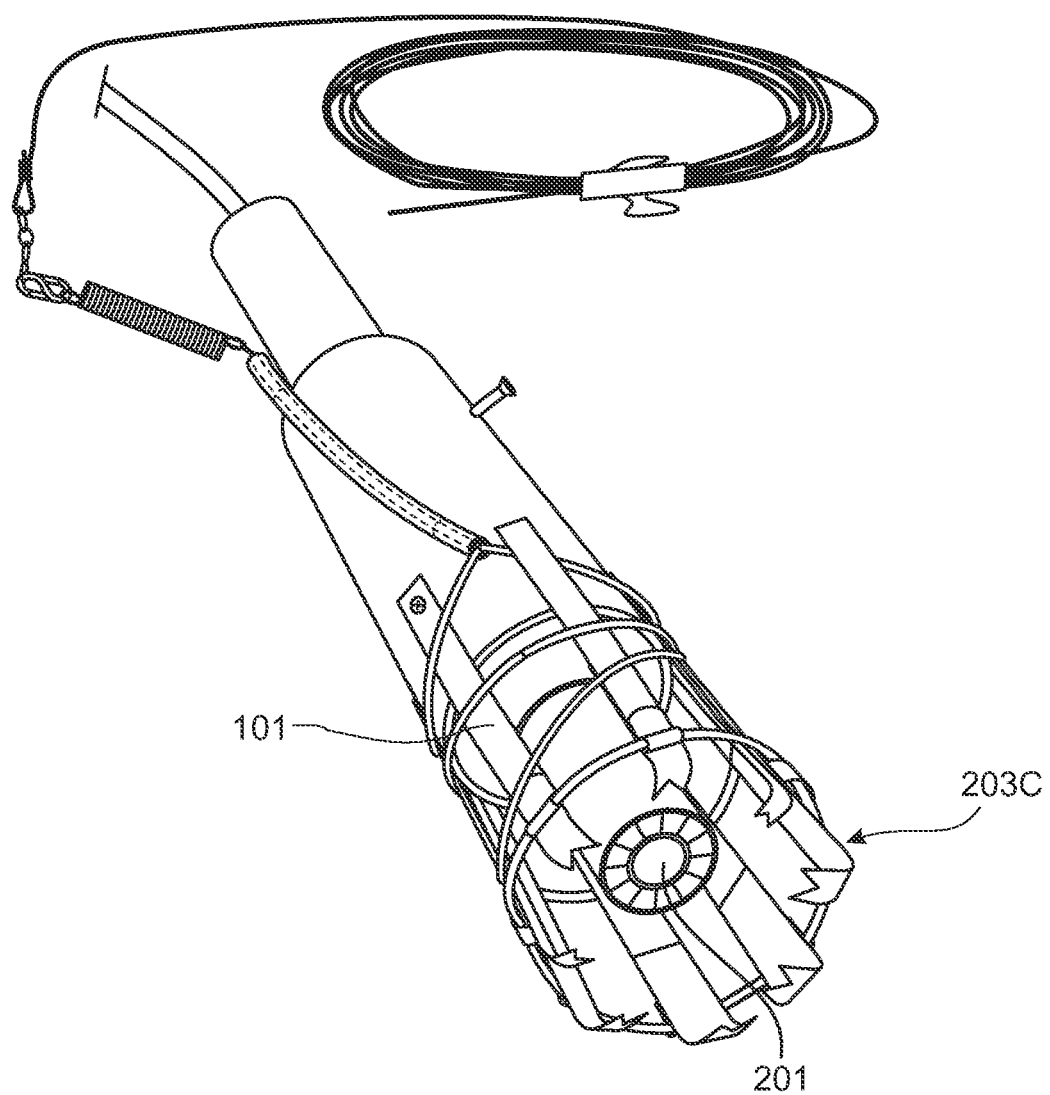
Figure 6D:
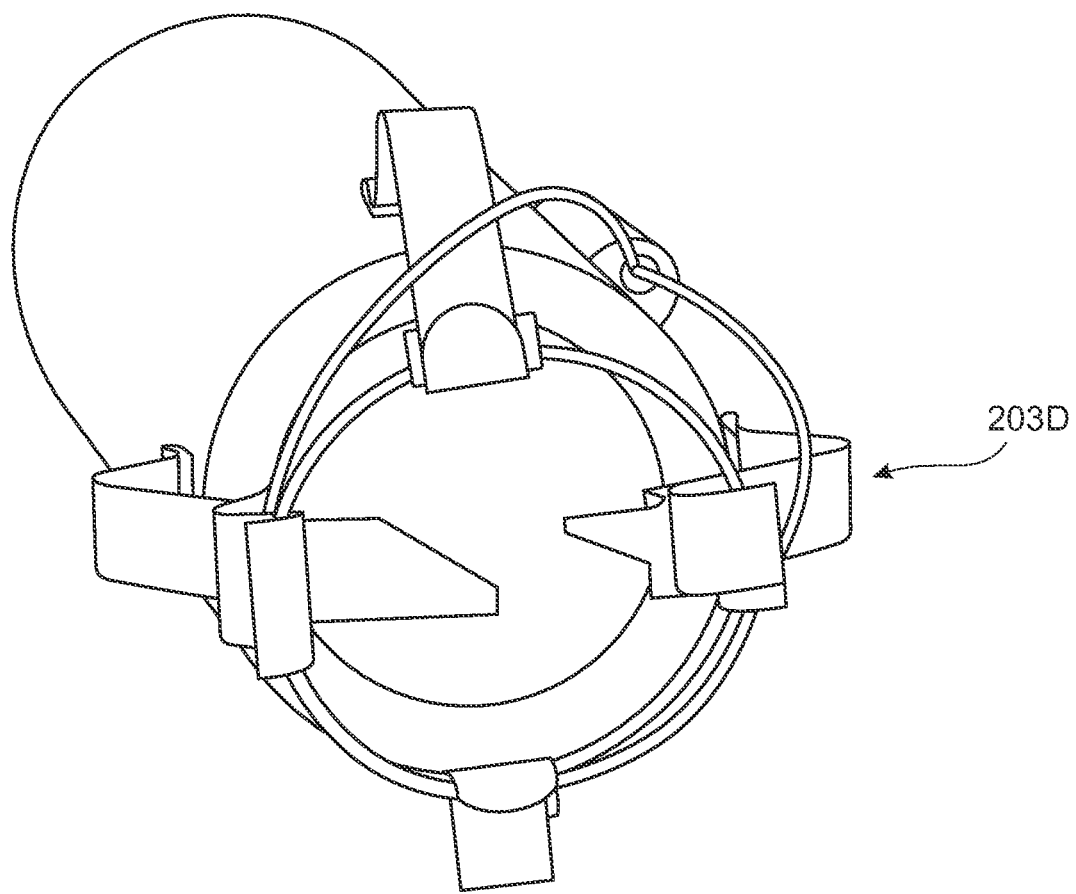
FIGS. 6D-E show the retrieval device with alternative gripping features according to an embodiment of the present invention.
Figure 6E:
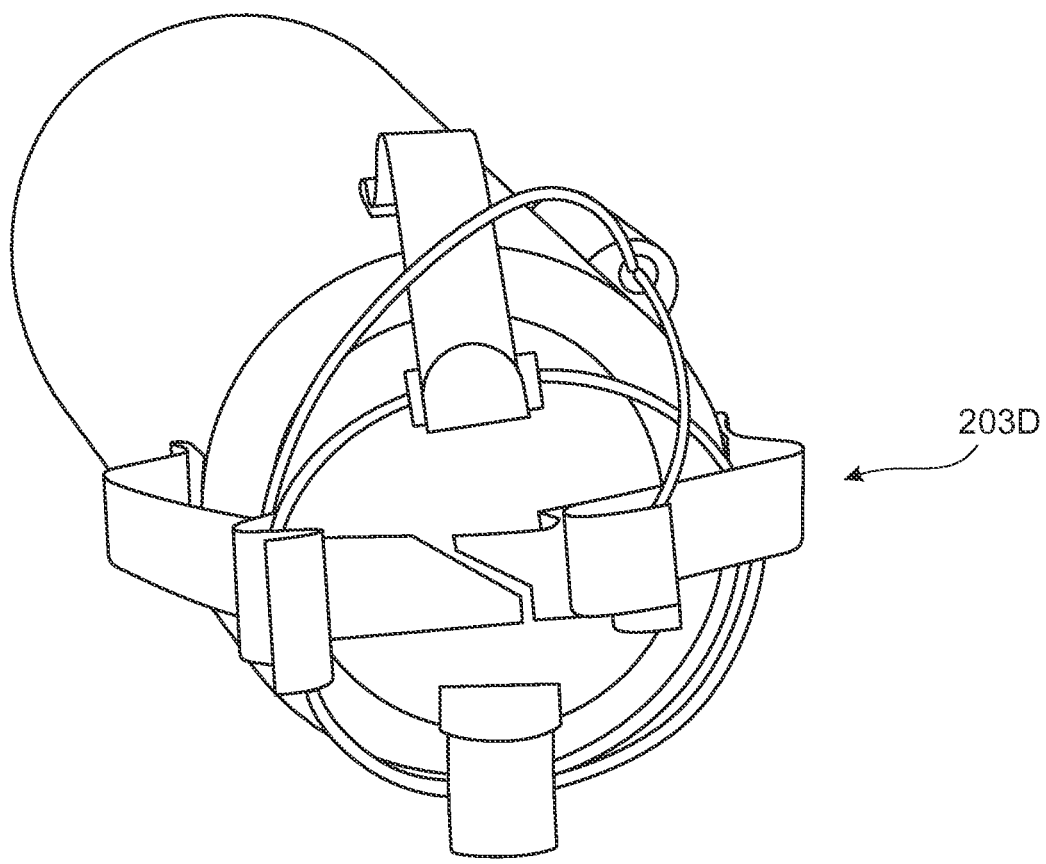

In one embodiment, each arm of the plurality of arms is attached to a distal end of the body 104. In some embodiments, each arm includes gripping features 203 designed to assist in catching, gripping, grabbing the intended item to be retrieved. In some embodiments, the gripping features may be positioned at an end portion of each arm and/or be positioned at an interior portion towards the distal end of each arm. The gripping features may include, but are not limited to, barbs, flared ends, flanged sections, protrusions, textures, or similar elements. The intended item may be any item or object desired for retrieval, including but not limited to, washers, screws, tools, drill bits, broken objects, including metallic and non-metallic items. Best seen in FIGS. 6A-E, a plurality of gripping features are shown 203A-D. In FIGS. 6D-E, a four arm closure system is shown enabling a full closure gripping feature 203D intended for picking up small items.

In one embodiment, the control cable 102 has a first end and a second end, wherein the first end is anchored to the body 104, and the second end is configured to close, via a pulling motion from a user, the plurality of arms 101. In some embodiments, a portion of the control cable 102 is wrapped around the plurality of arms 101. In some embodiments, the control cable 102 is wrapped in a crisscross formation, which helps maximize the closing of the plurality of arms 101 with minimal pulling effort from the user. In some embodiments, a channel 105 is provided approximate to the distal end on each arm, wherein the channels are configured to receive the control cable 102 aiding in closing or pulling the plurality of arms 101 together to grab the intended item. As the retrieval depth may vary, and in some cases the depth may be over 500 feet, the control cable length is generally fixed, and the second end is attached to the resilient connecting device 103, which is configured to be attached to an additional cable 106 at a suitable length for the retrieval depth.

Figure 4:
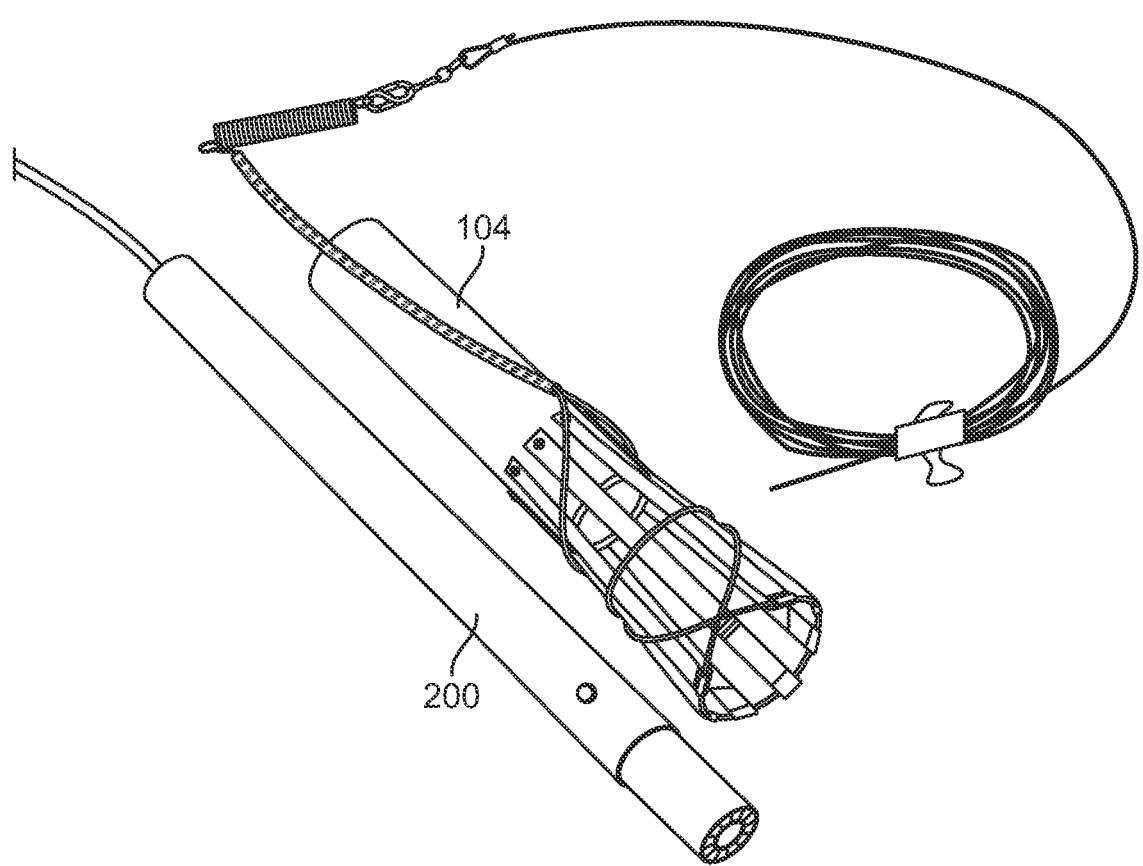
FIG. 4 is a perspective view of a retrieval device and a camera device according to an embodiment of the present invention.
Figure 5:
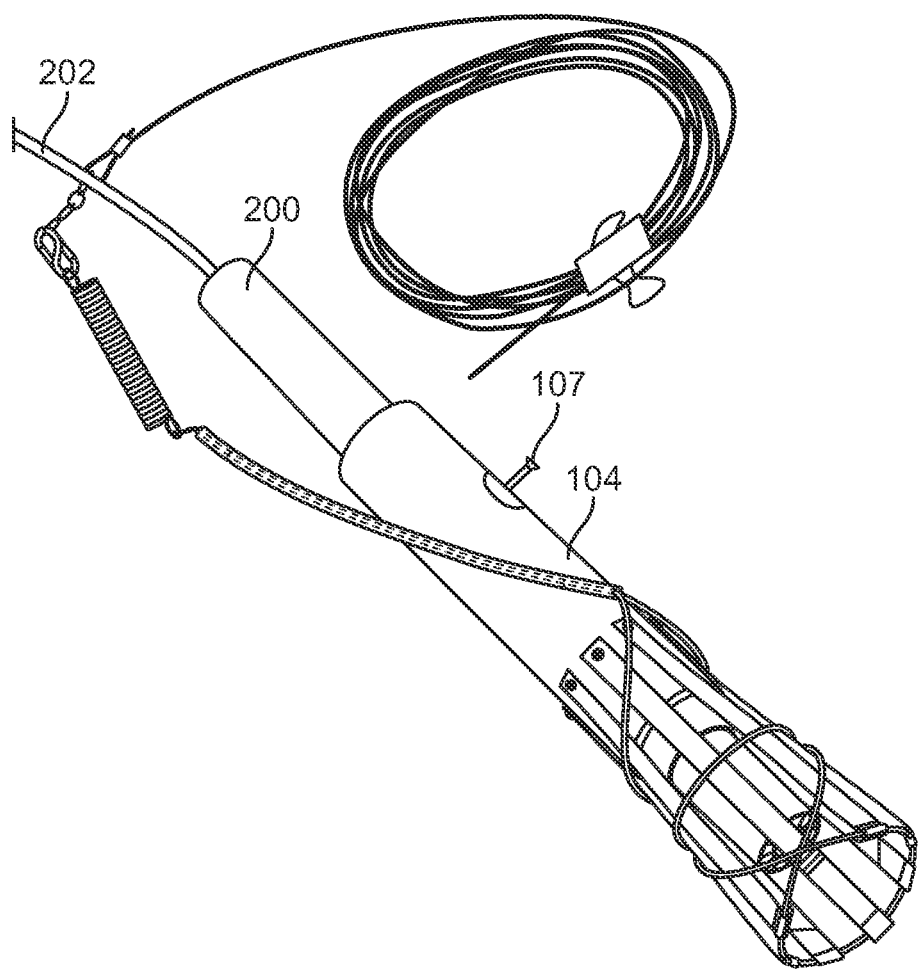
FIG. 5 is a perspective view of the retrieval device with the camera device attached within the body of the retrieval device according to an embodiment of the present invention.

Best seen in FIGS. 4-6, in some embodiments, a camera 200 is provided to improve the user's ability to see the intended item to be retrieved and to navigate the depth of the well. As the body 104 is constructed as a hollow cylinder, the camera 200 is configured to be placed within the hollow cylinder of the body 104, such that the camera lens 201 (FIG. 6) is extended towards the end of the retrieval device 100 as illustrated. In one embodiment, a set screw 107 is used to secure the camera 200 within the body 104. As shown, the camera 200 is connected to a camera cable 202, wherein the camera cable 202 is configured to be used with the additional cable/control cable 102 to retrieve the intended item by pulling it back to the surface and out of the well or pipe. More specifically, the camera cable 202 is used for resistance, while the control cable 102 (via the additional cable 106) is pulled to close/tighten the plurality of arms 101 around the item.

Figure 7:
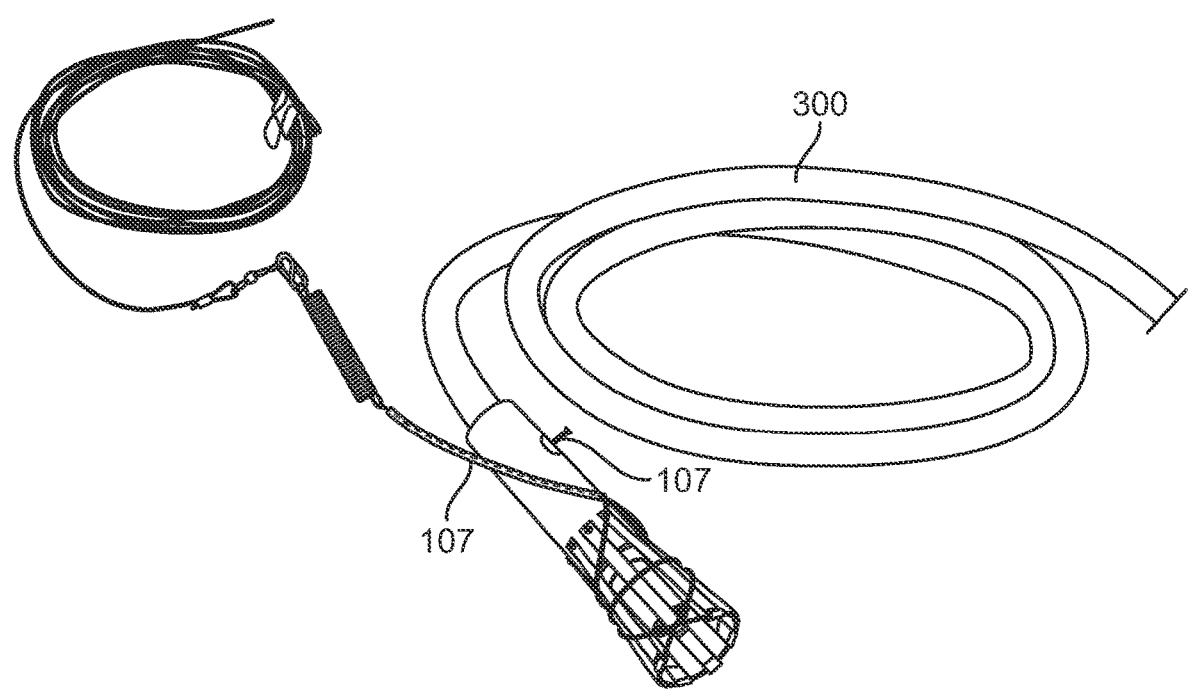
FIG. 7 is a perspective view of a retrieval device with an extended body tube according to an embodiment of the present invention.

Various modifications will now be described below, however, it should be understood that the basic function of the device is the same. Referring now to FIG. 7, in some embodiments where a camera is not provided, an extended body tube 300 may be attached within the body 104 via the set screw 107. In this embodiment, the extended body tube 300 essentially replaces the function of the camera cable described above. The length of the extended body tube 300 may vary depending on the requirements and depth of the retrieval. The tube may be rigid or flexible.

Figure 8:
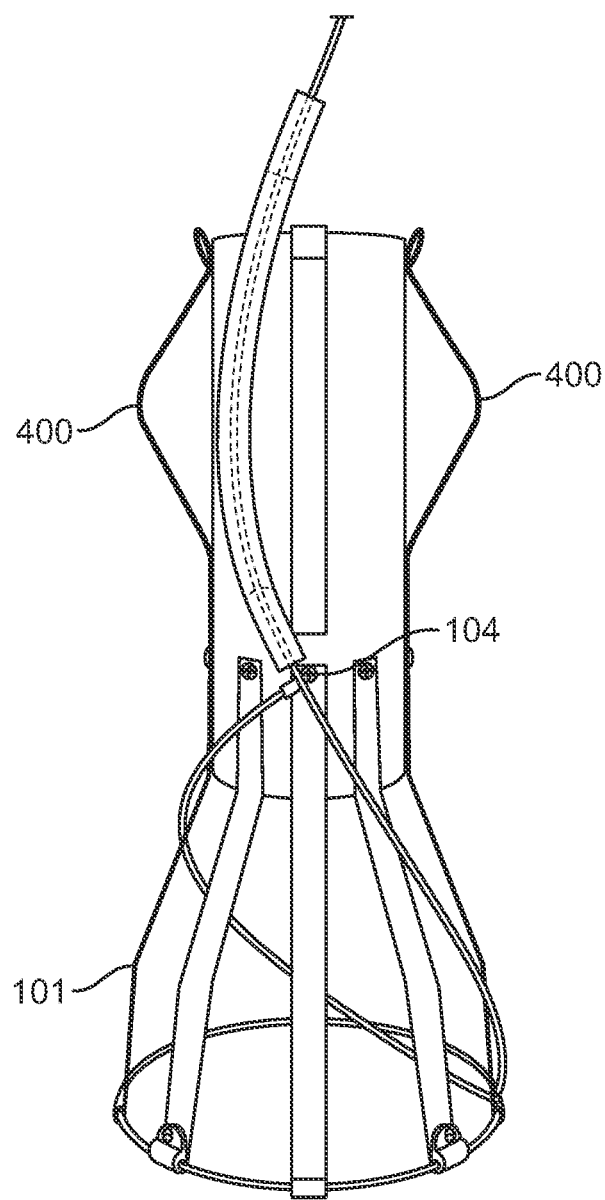
FIG. 8 is a front perspective view of an additional retrieval device with skids according to an embodiment of the present invention.
Figure 9:
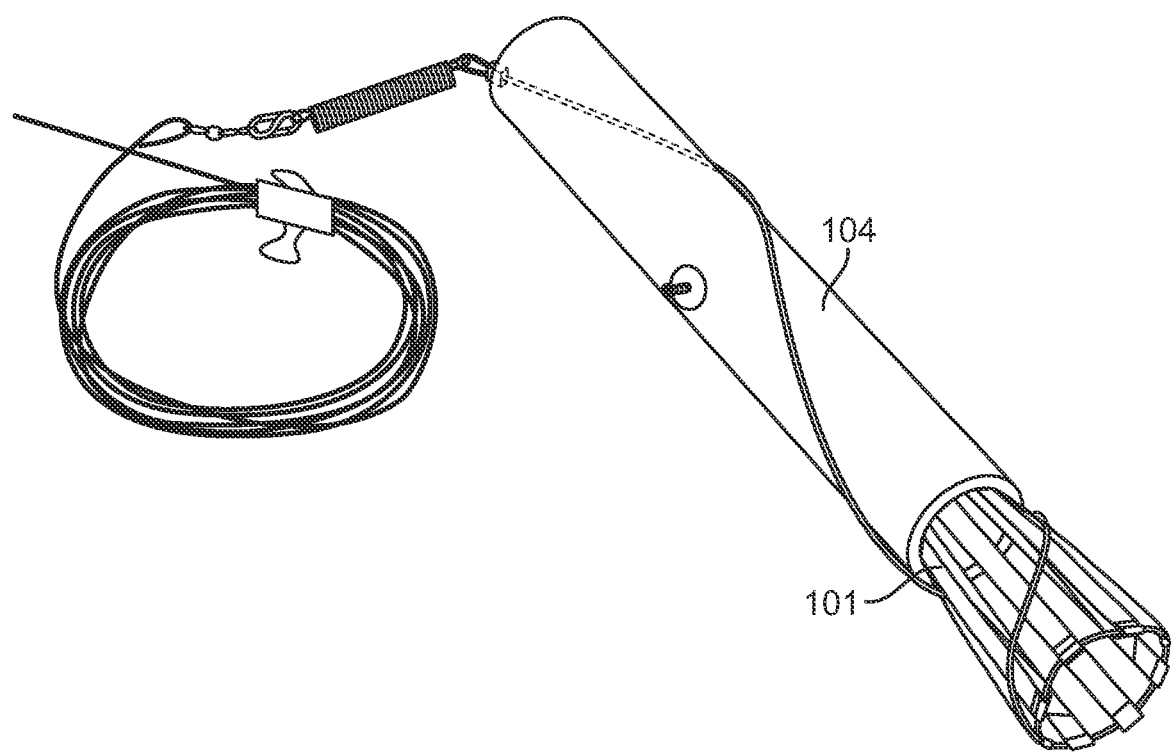
FIG. 9 is a perspective view of a second additional retrieval device having an alternative mounting location for the plurality of arms according to an embodiment of the present invention.
Figure 10:
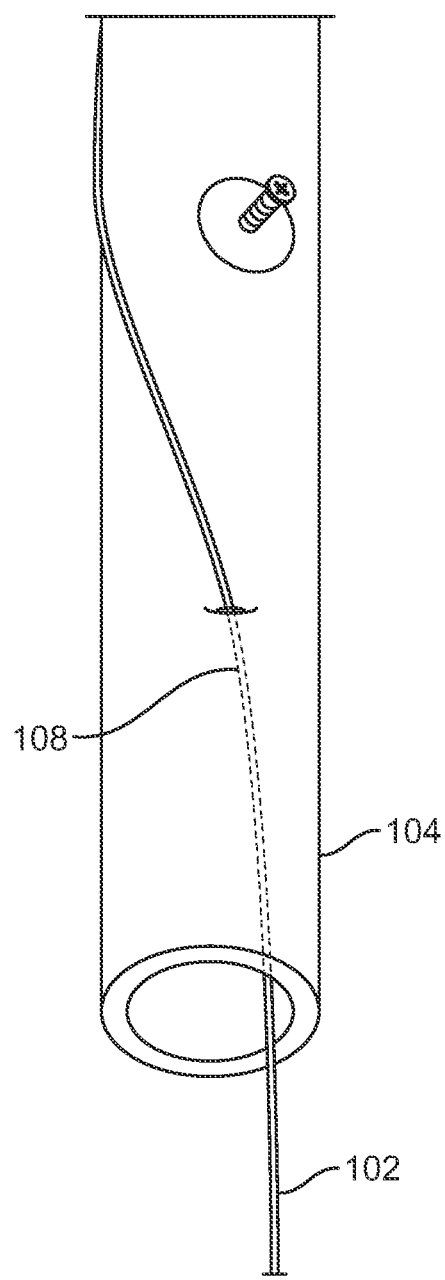
FIG. 10 is a detailed view of FIG. 9.

Referring now to FIG. 8, a number of skids 400 are provided on the body 104, wherein the skids 400 are used to maintain elevation of the retrieval device. This embodiment is primarily used for horizontal pipe retrievals, as opposed to the typical vertical well retrievals. Advantageously, the skids 400 assist in helping prevent the retrieval device from getting stuck during entry and exit. Further, in this embodiment, the plurality of arms 101 are bent and configured to act as skids for the distal end of the device. Also, each arm is attached to an exterior portion of the body 104. In some embodiments, as seen in FIG. 9, the plurality of arms 100 are mounted within the interior of the body 104. In this embodiment, a hole 108 is provided on the body 104 enabling the control cable 102 to extend from the exterior of the body to within the body (best seen in FIG. 10).

Figure 11:
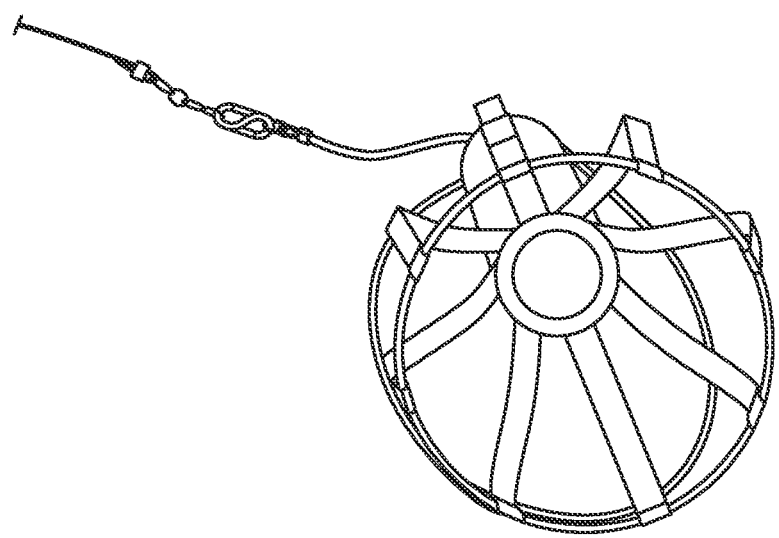
FIG. 11 is a retrieval device in an open position according to an embodiment of the present invention.
Figure 12:
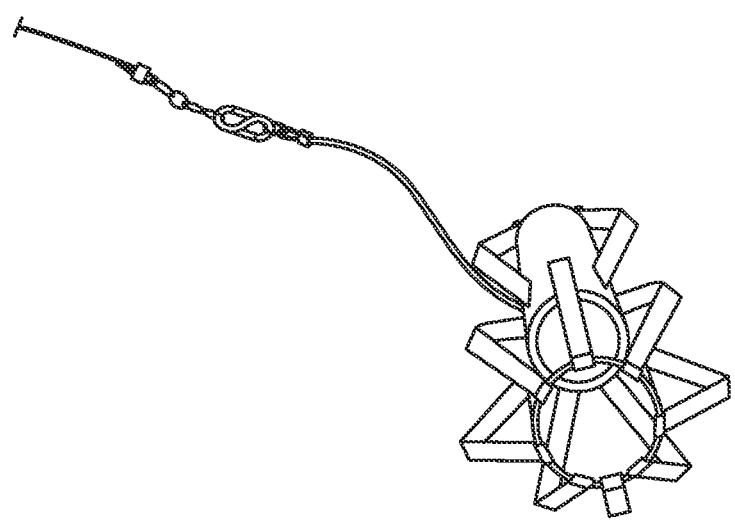
FIG. 12 is a retrieval device in a closed position according to an embodiment of the present invention.

FIGS. 11 and 12 show one version of the retrieval device in an open and closed position respectively. As previously described, a user manipulates and closes the plurality of arms by pulling the control cable. When the control cable is retracted, the plurality of arms open back to their starting position.

Figure 13:
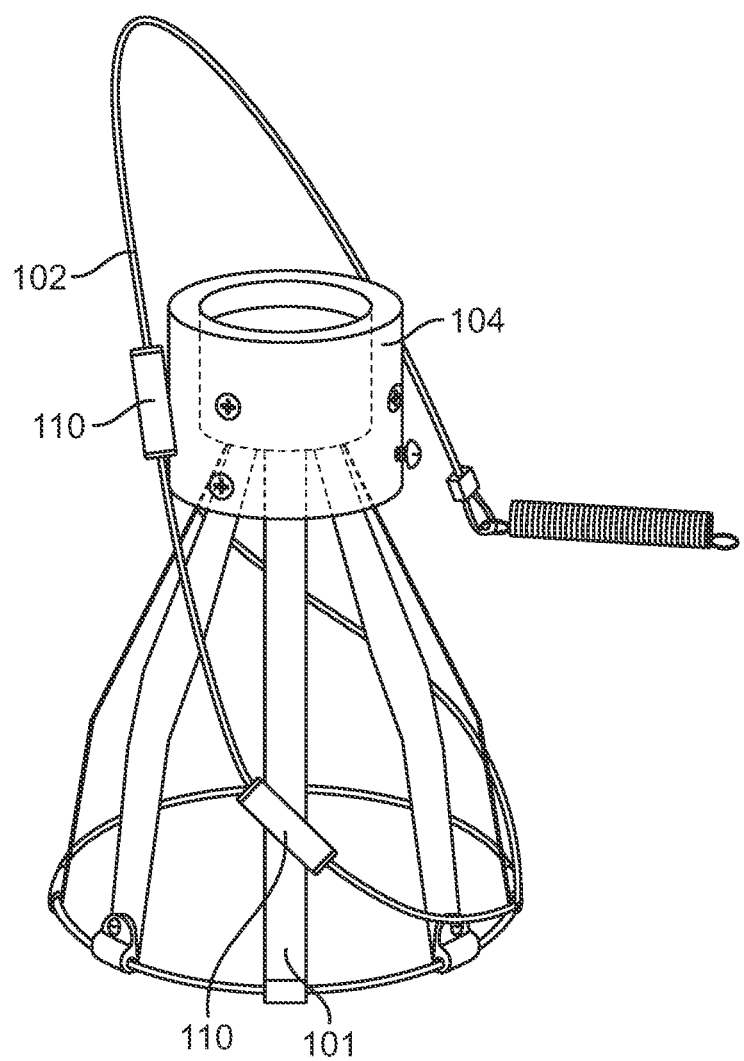
FIG. 13 is a front perspective view of a third additional retrieval device with a truncated body and extra channels according to an embodiment of the present invention.
Figure 14:
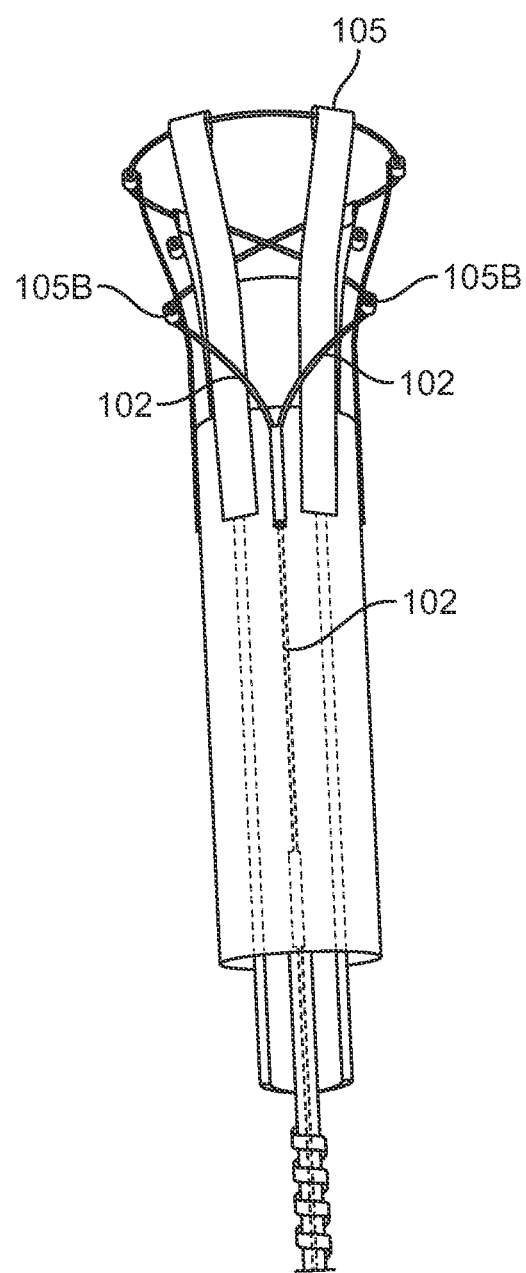
FIG. 14 is a top perspective view of a fourth additional retrieval device having an alternative cable control configuration according to an embodiment of the present invention.

The illustrated embodiments are sized for item retrieval for 2", 4", and 6" well pipes or plumbing pipes spanning 5 to over 500 feet. In some embodiments, the retrieval device (body and arms) is approximately 8 to 16 inches in length and approximately 2 inches in diameter. In some embodiments, the body is made of plastic and the arms are made from metal, however, one skilled in the art will appreciate changes in dimensions, materials, shapes, etc. as necessary to facilitate the retrieval of items at various depths and types of wells and pipes. For example, FIG. 13 shows a retrieval device having a smaller body portion 104, useful when navigating around corners in plumbing pipes. This embodiment also shows additional channels 110 enabling greater ease in pulling and retracting the plurality of arms. FIG. 14 illustrates an embodiment of the retrieval device having a control cable 102 that isn't anchored to the body as previously described, rather the control cable is a "double pull" design, wherein both ends of the control cable 102 are used to pull, via the user, the plurality of arms 101 together. In some embodiments, additional channels 105B are provided on the arms to assist the control cable to adequately wrap around the arms to provide effective closure of the arms when pulling the control cable.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternative embodiments are contemplated, and can be made without departing from the spirit and scope of the invention. For example, any retrieval device version or embodiment, may include any feature, component, etc. described even if not explicitly shown or described. In some embodiments, the present invention may be used to pickup options not in wells or similar structures, as well as reaching high areas to change ceiling light bulbs, wherein the device may be attached to a pole, such as a painters pole.

It should further be noted that throughout the entire disclosure, the labels such as left, right, front, back, top, bottom, forward, reverse, clockwise, counterclockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

What is claimed is:

1. A retrieval device comprising:
   a body;
   a plurality of arms attached to a distal end of the body, wherein each arm includes gripping features designed to secure items to be retrieved; and,
   a control cable connected to the plurality of arms to facilitate movement from an open to a closed position, thereby enabling capture of an item, wherein the control cable is configured to wrap around the plurality of arms in a crisscross formation to maximize closure efficiency with minimal user effort.

2. The retrieval device of claim 1, further comprising a resilient connecting device attached to the control cable, configured for connection to an additional cable of suitable length based on retrieval depth.

3. The retrieval device of claim 1, further comprising a camera device positioned within the body to aid in locating the item to be retrieved.

4. The retrieval device of claim 3, wherein the body is a hollow cylinder allowing for the insertion of the camera device such that its lens extends towards the end of the retrieval device.

5. The retrieval device of claim 3, further comprising a set screw for securing the camera device within the body.

6. The retrieval device of claim 1, wherein the gripping features are selected from at least one of flared ends, flanged sections, protrusions, textures, and full closure ends, wherein the gripping features are designed to improve grip on the intended item.

7. The retrieval device of claim 1, further comprising a channel located near the distal end of each arm of the plurality of arms, wherein the channel is configured to guide the control cable to facilitate the pulling and closing of the arms.

8. The retrieval device of claim 1, further comprising a body tube configured to attach to the body enabling an extension of the body to a desired length, wherein the body tube is rigid or flexible.

9. The retrieval device of claim 1, further comprising skids attached to the body to maintain elevation and facilitate ease of movement within horizontal pipes.

10. The retrieval device of claim 1, wherein the plurality of arms are configured to act as skids for the distal end of the device when in contact with the interior surfaces of a well or pipe.

11. The retrieval device of claim 1, wherein the plurality of arms are mounted within the interior of the body, and a hole is provided on the body to allow the control cable to extend from the exterior to within the body.

12. The retrieval device of claim 1, wherein the plurality of arms are capable of transitioning between open and closed positions through user manipulation of the control cable, allowing for the capture and release of items.

* * * * *